(12) United States Patent
Kamiya (10) Patent No.: US 12,117,531 B2
(45) Date of Patent: Oct. 15, 2024

(54) SENSOR SYSTEM

(71) Applicant: KOITO MANUFACTURING CO., LTD., Tokyo (JP)

(72) Inventor: Misako Kamiya, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 919 days.

(21) Appl. No.: 17/265,608

(22) PCT Filed: Jul. 23, 2019

(86) PCT No.: PCT/JP2019/028824
§ 371 (c)(1),
(2) Date: Feb. 3, 2021

(87) PCT Pub. No.: WO2020/031685
PCT Pub. Date: Feb. 13, 2020

(65) Prior Publication Data
US 2021/0165103 A1    Jun. 3, 2021

(30) Foreign Application Priority Data
Aug. 7, 2018    (JP) ................................ 2018-148279

(51) Int. Cl.
*G01S 17/931*    (2020.01)
*G01S 7/481*    (2006.01)
*G01S 7/487*    (2006.01)

(52) U.S. Cl.
CPC .......... *G01S 17/931* (2020.01); *G01S 7/4813* (2013.01); *G01S 7/4876* (2013.01); *G01S 7/4811* (2013.01); *G01S 7/4817* (2013.01)

(58) Field of Classification Search
CPC .... G01S 17/931; G01S 7/4813; G01S 7/4876; G01S 7/4811; G01S 7/4817
See application file for complete search history.

(56) References Cited

U.S. PATENT DOCUMENTS

2008/0002176 A1* 1/2008 Krasutsky ............ G01S 7/4813
356/5.01
2014/0240719 A1 8/2014 Koeppe
(Continued)

FOREIGN PATENT DOCUMENTS

CN    206193242 U    5/2017
JP    2003-121546 A    4/2003
(Continued)

OTHER PUBLICATIONS

Office Action dated May 9, 2023, issued by Japanese Patent Office for Japanese Application No. 2020536436.
(Continued)

*Primary Examiner* — Isam A Alsomiri
*Assistant Examiner* — Joseph C Fritchman
(74) *Attorney, Agent, or Firm* — Sughrue Mion, PLLC (57) ABSTRACT

A light emitting element emits detecting light toward an outside area of a vehicle. A light receiving element outputs a light receiving signal corresponding to reflected light. A processor detects information of the outside area on the basis of the light receiving signal. A translucent cover forms a part of an outer surface of the vehicle, and has a plurality of flat portions allowing passage of the detecting light. The processor excludes, from the information to be detected, a position corresponding a boundary portion between adjacent ones of the flat portions.

4 Claims, 7 Drawing Sheets

(56) References Cited

U.S. PATENT DOCUMENTS

| | | |
|---|---|---|
| 2016/0231415 A1 | 8/2016 | Liao et al. |
| 2017/0219696 A1 | 8/2017 | Hayakawa et al. |
| 2017/0248691 A1* | 8/2017 | McPhee .................. G01S 17/42 |
| 2018/0074175 A1 | 3/2018 | O'Keeffe |
| 2018/0180243 A1 | 6/2018 | Na |
| 2019/0154803 A1* | 5/2019 | Eichenholz ............. G01S 17/42 |

FOREIGN PATENT DOCUMENTS

| | | | |
|---|---|---|---|
| JP | 2003-159222 A | | 6/2003 |
| JP | 2009-276164 A | | 11/2009 |
| JP | 2010-185769 A | | 8/2010 |
| JP | 2012068066 A | * | 4/2012 |
| JP | 2013-019790 A | | 1/2013 |
| JP | 2013-031053 A | | 2/2013 |
| JP | 2014-240819 A | | 12/2014 |
| JP | 2015-146396 A | | 8/2015 |
| JP | 2016-156809 A | | 9/2016 |
| JP | 2017-138298 A | | 8/2017 |
| JP | 2017-191804 A | | 10/2017 |
| JP | 2018-9831 A | | 1/2018 |
| WO | 2016/050447 A1 | | 4/2016 |

OTHER PUBLICATIONS

International Search Report (PCT/ISA/210) issued Oct. 21, 2019 in counterpart International Patent Application No. PCT/JP2019/028824.

Written Opinion (PCT/ISA/237) issued Oct. 21, 2019 in counterpart International Patent Application No. PCT/JP2019/028824.

Communication issued on Apr. 17, 2024 by the China National Intellectual Property Administration for Chinese Patent Application No. 201910725810.6.

* cited by examiner

SENSOR SYSTEM

FIELD

The presently disclosed subject matter relates to a sensor system adapted to be installed in a vehicle.

BACKGROUND

In order to realize driving support technology of the vehicle, a sensor for detecting information in an outside area of the vehicle shall be mounted on a vehicle body. Examples of such sensors include LiDAR (Light Detection and Ranging) sensors (see Patent Document 1, for example).

The LiDAR sensor includes a light emitting element and a light receiving element. The light emitting element emits detecting light toward an outside area of the vehicle. The detecting light is reflected by an object that situates in the outside area of the vehicle, and incident on the light receiving element as reflected light. The light receiving element outputs a signal based on the reflected light. Based on the signal, information in the outside area of the vehicle is detected.

CITATION LIST

Patent Document

Patent Document 1: Japanese Patent Publication No. 2010-185769 A

SUMMARY

Technical Problem

For the purpose of protection from dirt and flying stones, the LiDAR sensor is covered with a translucent cover forming a part of the outer surface of the vehicle. Accordingly, the detecting light passes through the translucent cover and is directed to the outside of the vehicle. The translucent cover refracts the detecting light. As a result, there is a difference between a point on an extension line of the detecting light incident on the translucent cover and a point at which the detecting light emitted from the translucent cover reaches. This difference affects the detection of information in the outside area of the vehicle.

Accordingly, it is demanded to suppress the influence of the translucent cover, that allows the passage of light for detecting the external information of the vehicle, on the detection of the information.

Solution to Problem

In order to meet the demand described above, a first illustrative aspect of the presently disclosed subject matter provides a sensor system adapted to be installed in a vehicle, comprising:
a light emitting element configured to emit detecting light toward an outside area of the vehicle;
a light receiving element configured to output a signal corresponding to reflected light;
a processor configured to detect information of the outside area on the basis of the signal; and
a translucent cover configured to form a part of an outer surface of the vehicle, and having a plurality of flat portions configured to allow passage of the detecting light,
wherein the processor is configured to exclude, from the information to be detected, a position corresponding a boundary portion between adjacent ones of the flat portions.

According to such a configuration, not only can the refraction when the detecting light passes through the translucent cover be reduced, but also, since the position corresponding to the boundary portion whose behavior is not expected is excluded from the information to be detected, it is possible to suppress the influence of the translucent cover on the information detection.

The sensor system according to the first illustrative aspect may be configured such that a surface of the translucent cover at the boundary portion is made opaque for at least a wavelength of the detecting light.

According to such a configuration, since the detecting light can be prevented from passing through the boundary portion, it is possible to prevent the occurrence of an unexpected behavior of the detecting light caused by the passage of the translucent cover.

In order to meet the demand described above, a second illustrative aspect of the presently disclosed subject matter provides a sensor system adapted to be installed in a vehicle, comprising:
a light emitting element configured to emit detecting light toward an outside area of the vehicle;
a light receiving element configured to output a signal corresponding to reflected light;
a processor configured to detect information of the outside area on the basis of the signal; and
a translucent cover configured to form a part of an outer surface of the vehicle, and having a plurality of flat portions configured to allow passage of the detecting light,
wherein a surface of the translucent cover at a boundary portion between adjacent ones of the flat portions is made opaque for at least a wavelength of the detecting light.

According to such a configuration, since the detecting light can be prevented from passing through the boundary portion, it is possible to prevent the occurrence of an unexpected behavior of the detecting light caused by the passage of the translucent cover. In this case, even if no special processing is performed on the side of the processor, the position corresponding to the boundary portion can be excluded from the information to be detected. In addition, since the refraction when the detecting light passes through the translucent cover can be reduced, it is possible to suppress the influence of the translucent cover on the information detection.

The sensor system according to the second illustrative aspect may be configured such that a surface of the translucent cover at the boundary portion is curved.

It is desirable that the area excluded from the target of information detection is minimized. Accordingly, it is desirable that the area of the opaque portion is minimized. Since the surface of the translucent cover at the boundary portion is formed as a curved surface, it is easy to perform the opacifying treatment while minimizing the area of the opaque portion. In addition, the molding workability of the translucent cover (ease of removal from the mold or the like) is improved.

The sensor system according to the first and second illustrative aspects may be configured such that the light emitting element and the light receiving element are parts of either a LiDAR sensor unit or a TOF camera unit.

As used herein, the term "sensor unit" means a constituent unit of a component that can be distributed by itself as a single unit while providing a desired information detecting function.

As used herein, the term "driving support" means control processing that at least partially performs at least one of driving operation (steering operation, acceleration, deceleration), monitoring of a driving environment, and backup of driving operation. That is, the term "driving support" means not only the partial driving support such as braking function for collision avoidance and assisting function for lane-keeping, but also a full self-driving operation.

DESCRIPTION OF EMBODIMENTS

Examples of embodiments will be described below in detail with reference to the accompanying drawings. In each of the drawings used in the following description, the scale is appropriately changed in order to make each member have a recognizable size.

In the accompanying drawings, an arrow F represents a forward direction of the illustrated structure. An arrow B represents a rearward direction of the illustrated structure. An arrow U represents an upward direction of the illustrated structure. An arrow D represents a downward direction of the illustrated structure. An arrow L represents a leftward direction of the illustrated structure. An arrow R represents a rightward direction of the illustrated structure. The terms "left" and "right" used in the following descriptions represent the left-right directions when viewed from the driver's seat.

Figure 1:
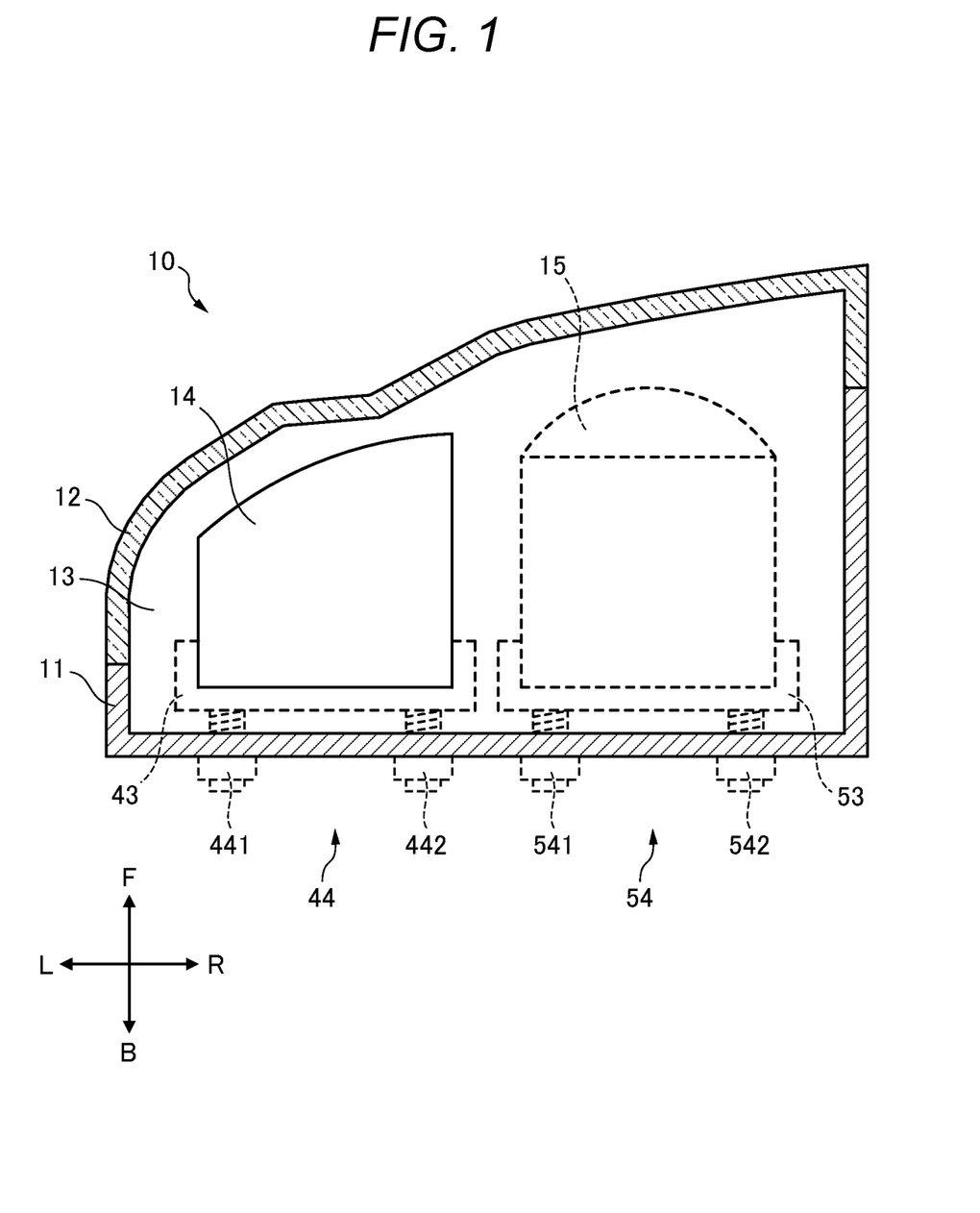
FIG. 1 illustrates a configuration of a left front sensor device according to an embodiment.

FIG. 1 illustrates a configuration of a left front sensor device 10 according to an embodiment. The left front sensor device 10 is disposed in a left front portion LF of the vehicle 100 illustrated in FIG. 2. The left front portion LF is an area located on the left of the center in a left-right direction of the vehicle 100 and ahead of the center in a front-rear direction of the vehicle 100.

As illustrated in FIG. 1, the left front sensor device 10 includes a housing 11 and a translucent cover 12. The housing 11 defines an accommodation chamber 13 together with the translucent cover 12. The translucent cover 12 forms a part of the outer surface of the vehicle 100.

The left front sensor device 10 includes a LiDAR sensor unit 14. The LiDAR sensor unit 14 is disposed in the accommodation chamber 13.

Figure 3:
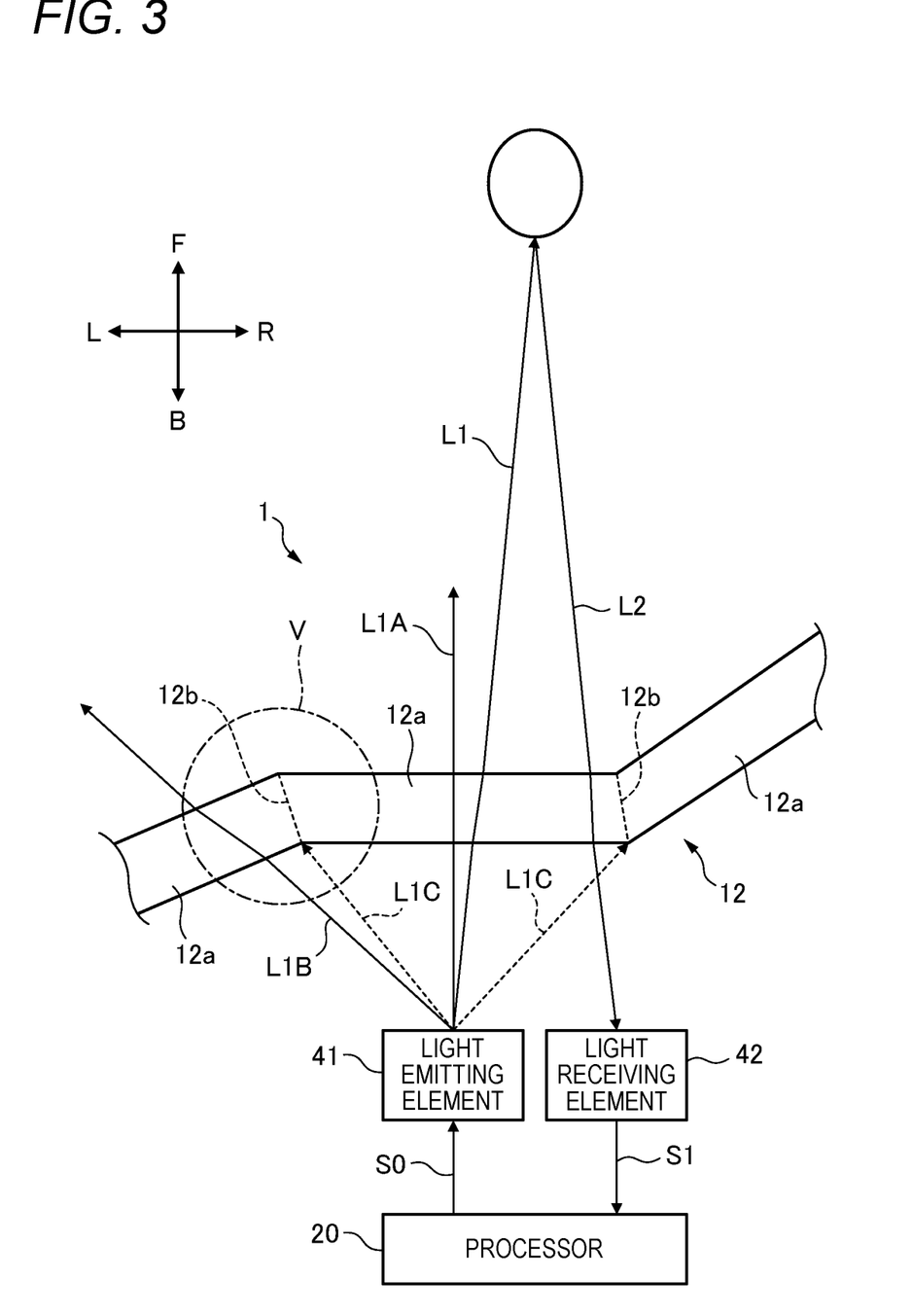
FIG. 3 illustrates a configuration of a sensor system including the left front sensor device of FIG. 1.

As illustrated in FIG. 3, the LiDAR sensor unit 14 includes a light emitting element 41 and a light receiving element 42. The translucent cover 12 covers the light emitting element 41 and the light receiving element 42.

The light emitting element 41 is configured to emit detecting light L1 toward the outside of the vehicle 100. As the detecting light L1, for example, infrared light having a wavelength of 905 nm can be used. As the light emitting element 41, a semiconductor light emitting element such as a laser diode or a light emitting diode can be used.

The LiDAR sensor unit 14 may appropriately include an optical system (not illustrated) for irradiating the detecting light L1 in a desired direction. The LiDAR sensor unit 14 may include a scanning mechanism (not illustrated) for changing the irradiating direction of the detecting light L1 to scan a detection area.

The light receiving element 42 is configured to output a light receiving signal S1 corresponding to the amount of incident light. As the light receiving element 42, a photodiode, a phototransistor, a photo resistor, or the like can be used. The LiDAR sensor unit 14 may include an amplifier circuit (not illustrated) for amplifying the light receiving signal S1.

The light emitting element 41, the light receiving element 42, and the translucent cover 12 constitute a sensor system 1. The sensor system 1 further includes a processor 20. The processor 20 outputs a control signal S0 for causing the light emitting element 41 to emit the detecting light L1 at a desired timing. The processor 20 receives the light receiving signal S1 outputted from the light receiving element 42.

The processor 20 detects information in an outside area of the vehicle 100 based on the light receiving signal S1 corresponding to reflected light L2. For example, the processor 20 can obtain a distance to an object associated with the reflected light L2 based on the time period from the time when the detecting light L1 is emitted in a certain direction to the time when the reflected light L2 is detected. Further, by accumulating such data as to the distance in association with the detecting position, it is possible to acquire information as to the shape of the object associated with the reflected light L2. Additionally or alternatively, information as to an attribute such as the material of the object associated with the reflected light L2 can be acquired based on the difference in waveforms of the detecting light L1 and the reflected light L2.

The translucent cover 12 has a plurality of flat portions 12a. The processor 20 is configured to exclude positions corresponding to boundary portions 12b formed between the adjacent flat portions 12a from objects to be detected.

Figure 4A:
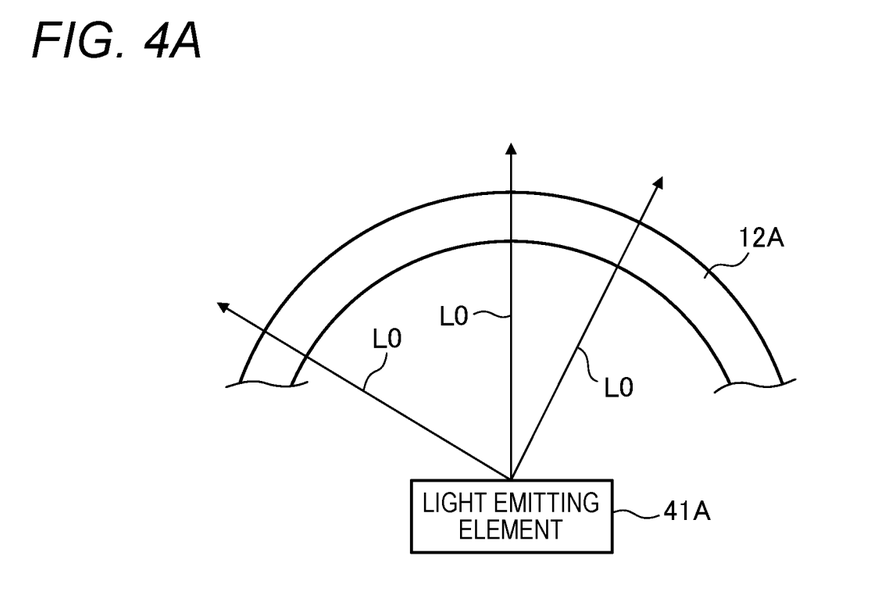
FIG. 4A illustrates a translucent cover according to a comparative example.

FIG. 4A illustrates a translucent cover 12A and a light emitting element 41A according to a comparative example. In this example, the translucent cover 12A has an arcuate cross section. The translucent cover 12A and the light emitting element 41A are disposed such that the center of curvature of the arcuate shape coincides with the center of light emission of detecting light L0 emitted from the light emitting element 41A, such as the light source position and the center of scan.

According to such an arrangement, the detecting light L0 emitted from the light emitting element 41A can pass through the translucent cover 12A without being refracted regardless of the emitted direction. However, the shape of the translucent cover 12A and the positional relationship with the light emitting element 41 may be a considerable constraint on the design of the sensor device.

Figure 4B:
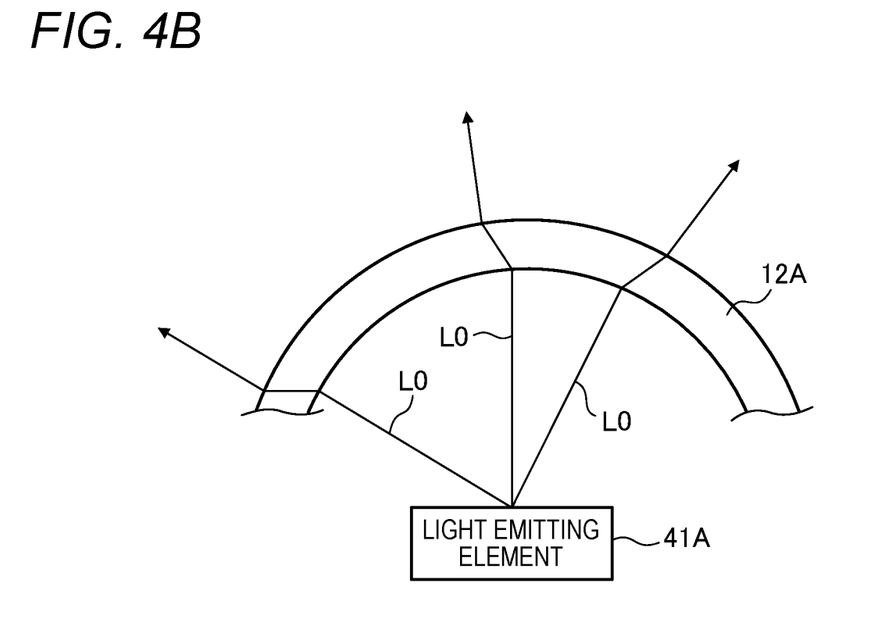
FIG. 4B illustrates a translucent cover according to a comparative example.

In addition, as illustrated in FIG. 4B, if the center of curvature of the arcuate shape does not coincide with the center of emission of the detecting light L0, the detecting light L0 is greatly refracted by the curved surface of the translucent cover 12A. That is, not only high accuracy is required for the positioning of the component, but also the information sensing accuracy is likely to be affected by the positional deviation caused by vibration or aging.

On the other hand, in the present embodiment illustrated in FIG. 3, the detecting light L1 emitted from the light emitting element 41 is allowed to pass through the flat portion 12*a* of the translucent cover 12.

According to such a configuration, it is easy to cause the detecting light L1 to enter the translucent cover 12 perpendicularly. In this case, the detecting light L1 is not refracted when passing through the translucent cover 12. For example, the detecting light L1A illustrated in FIG. 3 is incident perpendicularly on the translucent cover 12. Even if the translucent cover 12 and the light emitting element 41 are relatively displaced in the left-right direction from this state, the state in which the detecting light L1A is incident perpendicularly on the translucent cover 12 can be maintained.

In addition, even if the incident light is obliquely incident on the flat portion 12*a* as in the detecting light L1B illustrated in FIG. 3, the refraction amount of the detecting light L1B is small as compared with a case where the detecting light L1B is incident on the curved surface illustrated in FIG. 4B.

However, by providing the flat portions 12*a* that can obtain such an advantageous effect, it is inevitable that the boundary portion 12*b* of the adjacent flat portions 12*a* is formed. In the boundary portion 12*b*, the behavior of the detecting light L1C caused by the passage of the translucent cover 12 cannot be expected. Accordingly, the processor 20 is configured not to detect information based on the reflected light L2 generated from the detecting light L1C emitted toward the boundary portion 12*b*.

For example, when scanning in which the light emitting direction of the detecting light L1 cyclically changes is performed, since the positional relationship between the light emitting element 41 and the boundary portion 12*b* is known, the processor 20 can grasp in advance at what timing the detecting light emitted is directed to the boundary portion 12*b*. Accordingly, the processor 20 may be configured not to perform the information detection processing based on the light receiving signal S1 corresponding to the reflected light generated by the detecting light L1C emitted at that timing.

Alternatively, in a case where a plurality of light emitting elements 41 are configured to emit the detecting light L1 in various directions, since the positional relationship with the boundary portion 12*b* is also known, the processor 20 can grasp in advance which detecting light emitted from which light emitting element 41 is directed to the boundary portion 12*b*. Accordingly, the processor 20 may be configured not to perform the information detection processing based on the light receiving signal S1 corresponding to the reflected light generated by the detecting light L1C emitted from that light emitting element 41.

Not only can the refraction when the detecting light L1 passes through the translucent cover 12 be reduced, but also, since the position corresponding to the boundary portion 12*b* whose behavior is not expected is excluded from the information to be detected, it is possible to suppress the influence of the translucent cover 12 on the information detection.

Figure 5A:
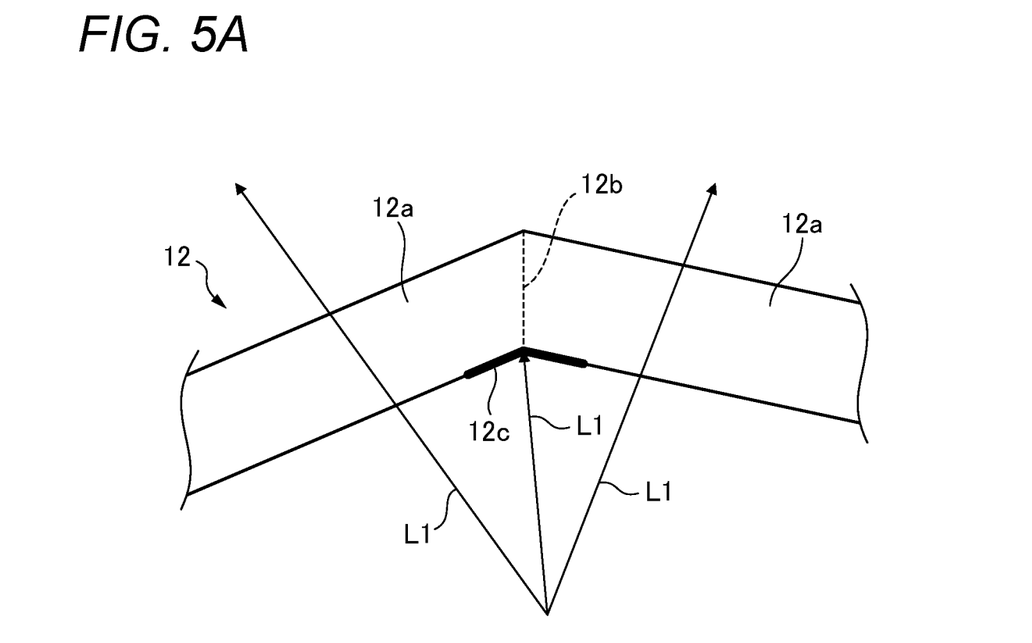
FIG. 5A illustrates another example of a translucent cover in the sensor system of FIG. 3.

FIG. 5A illustrates an enlarged view of a boundary portion 12*b* of the translucent cover 12 surrounded by a chain line V in FIG. 3. The surface of the translucent cover 12 at the boundary portion 12*b* may be formed as an opaque portion 12*c* for at least the wavelength of the detecting light L1 by applying opacification treatment. Examples of the opacifying treatment include treatment for making a surface into a state like frosted glass by forming fine unevenness, treatment for performing coating on the surface, and the like.

According to such a configuration, since the detecting light L1 can be prevented from passing through the boundary portion 12*b*, it is possible to prevent the occurrence of an unexpected behavior of the detecting light L1 caused by the passage of the translucent cover 12. In this case, even if no special processing is performed on the side of the processor 20, the position corresponding to the boundary portion 12*b* can be excluded from the information to be detected.

Not only can the refraction when the detecting light L1 passes through the translucent cover 12 be reduced, but also, since the position corresponding to the boundary portion 12*b* whose behavior is not expected is excluded from the information to be detected, it is possible to suppress the influence of the translucent cover 12 on the information detection.

Figure 5B:
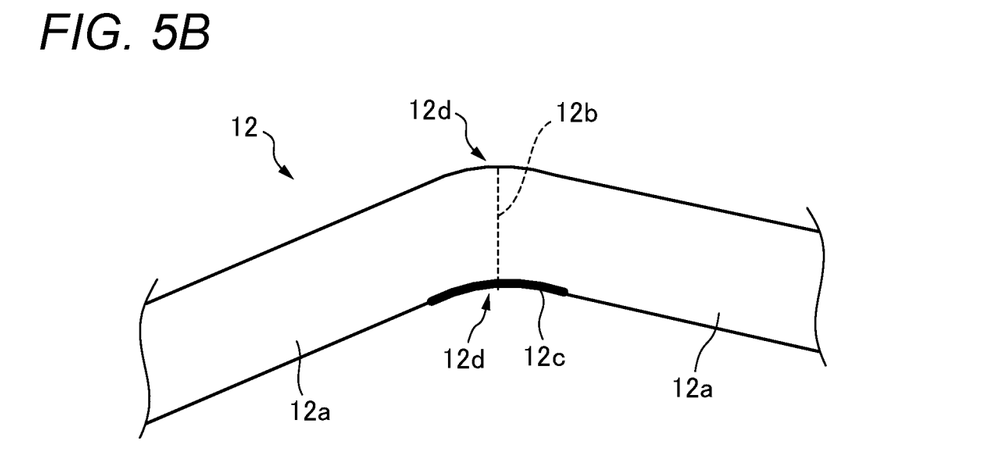
FIG. 5B illustrates another example of a translucent cover in the sensor system of FIG. 3.

As illustrated in FIG. 5B, the surface of the translucent cover 12 at the boundary portion 12*b* may be formed as a curved surface 12*d*.

It is desirable that the area excluded from the information to be detected is minimized. Accordingly, it is desirable that the area of the opaque portion 12*c* is minimized. Since the surface of the translucent cover 12 at the boundary portion 12*b* is formed as the curved surface 12*d*, it is easy to perform the opacifying treatment while minimizing the area of the opaque portion 12*c*. In addition, the molding workability of the translucent cover 12 (ease of removal from the mold or the like) is improved.

The functions of the processor 20 described later may be realized by a general-purpose microprocessor cooperating with a memory, or may be realized by a dedicated integrated circuit such as a microcontroller, an FPGA, and an ASIC.

The processor 20 may be disposed at any position in the vehicle. The processor 20 may be provided as a part of a main ECU responsible for central control processing in the vehicle, or may be provided as a part of a sub-ECU interposed between the main ECU and the LiDAR sensor unit 14.

As illustrated in FIG. 1, the left front sensor device 10 may include a lamp unit 15. The lamp unit 15 is disposed in the accommodation chamber 13. The lamp unit 15 is a device for emitting visible light to the outside of the vehicle 100. Examples of the lamp unit 15 include a headlamp unit, a clearance lamp unit, a direction indicator lamp unit, and a fog lamp unit. As used herein, the term "lamp unit" means a constituent unit of a component that can be distributed by itself as a single unit while providing a desired lighting function.

The lamp unit 15 is generally disposed at four corner portions of the vehicle 100. The four corner portions are also portions where there are few obstacles when detecting information in an outside area of the vehicle 100. By arranging the LiDAR sensor unit 14 so as to share the accommodation chamber 13 with the lamp unit 15, it is possible to efficiently detect the information in the outside area of the vehicle 100.

The left front sensor device 10 may include a sensor bracket 43 and a lamp bracket 53. The sensor bracket 43 and the lamp bracket 53 are independent of each other. The LiDAR sensor unit 14 is supported by the sensor bracket 43. The lamp unit 15 is supported by the lamp bracket 53.

The left front sensor device 10 may include a sensor aiming mechanism 44 and a lamp aiming mechanism 54. The sensor aiming mechanism 44 is a mechanism for adjusting a detecting reference direction of the LiDAR sensor unit 14. The lamp aiming mechanism 54 is a mechanism for adjusting a lighting reference direction of the lamp unit 15.

The sensor aiming mechanism 44 includes a first screw 441 and a second screw 442. The first screw 441 and the second screw 442 can be operated from the outside of the housing 11.

When the first screw 441 is operated, the posture of the sensor bracket 43 changes in the left-right direction about a fulcrum (not illustrated). As a result, the detecting reference direction of the LiDAR sensor unit 14 changes in the left-right direction. When the second screw 442 is operated, the posture of the sensor bracket 43 changes in the up-down direction about a fulcrum (not illustrated). As a result, the detecting reference direction of the LiDAR sensor unit 14 changes in the up-down direction. Each of the first screw 441 and the second screw 442 may be replaced with an actuator operated by an external control signal.

The lamp aiming mechanism 54 includes a first screw 541 and a second screw 542. The first screw 541 and the second screw 542 can be operated from the outside of the housing 11.

When the first screw 541 is operated, the posture of the lamp bracket 53 changes in the left-right direction about a fulcrum (not illustrated). As a result, the detecting reference direction of the lamp unit 15 changes in the left-right direction. When the second screw 542 is operated, the posture of the lamp bracket 53 changes in the up-down direction about a fulcrum (not illustrated). As a result, the detecting reference direction of the lamp unit 15 changes in the up-down direction. Each of the first screw 541 and the second screw 542 may be replaced with an actuator operated by an external control signal.

Figure 6:
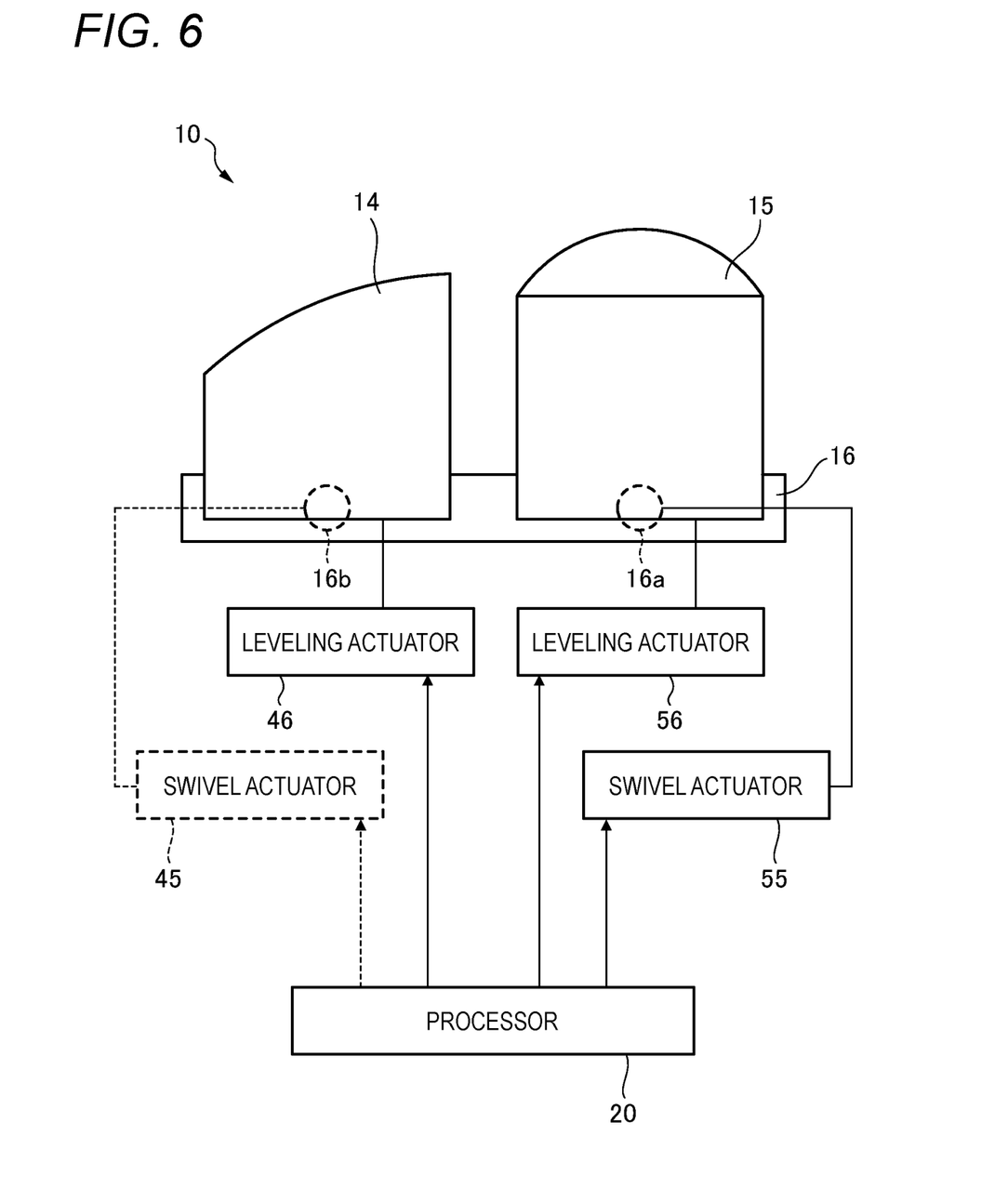
FIG. 6 illustrates another example of the left front sensor device of FIG. 1.

Alternatively, as illustrated in FIG. 6, the left front sensor device 10 may include a common bracket 16. The LiDAR sensor unit 14 and the lamp unit 15 are supported by the bracket 16.

Figure 7A:
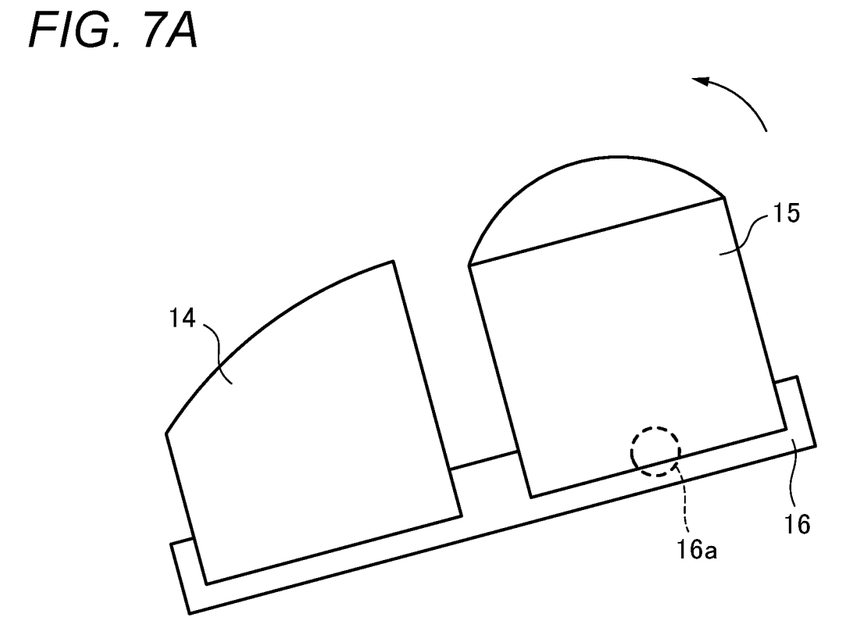
FIG. 7A illustrates an operation of the left front sensor device of FIG. 6.

In this case, the left front sensor device 10 may include a swivel actuator 55. The swivel actuator 55 may be controlled by the processor 20. As illustrated in FIG. 7A, the swivel actuator 55 changes the lighting reference direction of the lamp unit 15 in the left-right direction by causing the bracket 16 to pivot about a pivot shaft 16*a*.

The detecting reference direction of the LiDAR sensor unit 14 supported by the common bracket 16 also changes in the same direction. Since the detectable range of the LiDAR sensor unit 14 is relatively wide in the left-right direction, the influence on the information detection is relatively small even if the detecting reference direction changes.

Figure 7B:
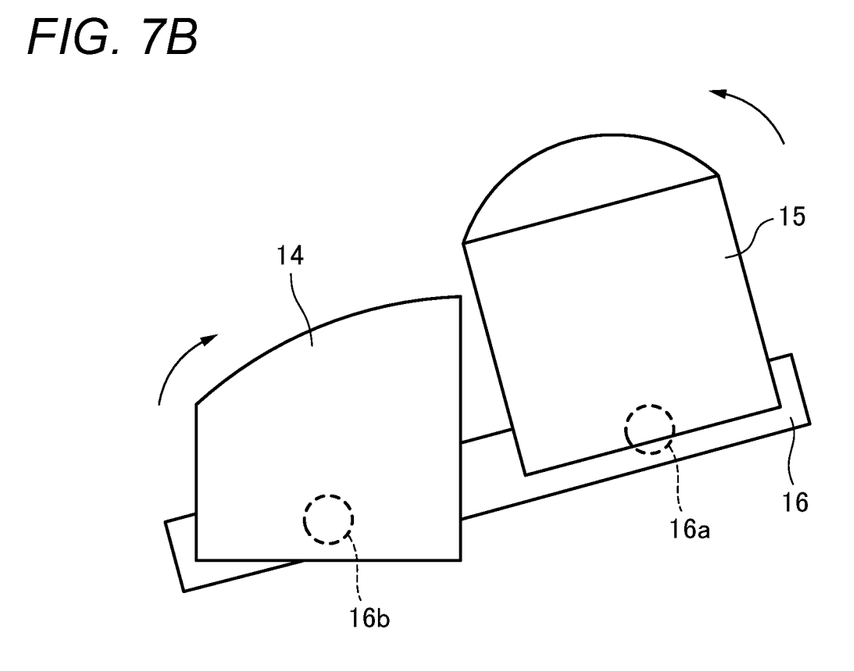
FIG. 7B illustrates an operation of the left front sensor device of FIG. 6.

However, if strict adjustment of the detecting reference direction of the LiDAR sensor unit 14 is necessary, the left front sensor device 10 may include a swivel actuator 45, as illustrated in FIG. 6. The swivel actuator 45 may be controlled by the processor 20. As illustrated in FIG. 7B, the swivel actuator 45 changes the detecting reference direction of the LiDAR sensor unit 14 in the left-right direction by causing the LiDAR sensor unit 14 about a pivot shaft 16*b*. As a result, it is possible to cancel the influence of the pivot movement of the bracket 16 by the swivel actuator 55.

Since the detectable range of the LiDAR sensor unit 14 is relatively narrow in the up-down direction, it is preferable that the left front sensor device 10 independently includes a leveling actuator 46 and a leveling actuator 56. The leveling actuator 46 changes the detecting reference direction of the LiDAR sensor unit 14 in the up-down direction. The leveling actuator 56 changes the detecting reference direction of the lamp unit 15 in the up-down direction.

The above embodiments are merely illustrative to facilitate understanding of the presently disclosed subject matter. The configuration according to each of the above embodiments can be appropriately modified or improved without departing from the gist of the presently disclosed subject matter.

The LiDAR sensor unit 14 may be replaced with a TOF (Time of Flight) camera unit. The TOF camera unit includes a light emitting element and a light receiving element. Detecting light emitted from the light emitting element is reflected by an object that situates in the outside area of the vehicle, and incident on the light receiving element as reflected light. The distance to the object can be calculated based on the time period from the time when the detecting light is emitted from the light emitting element to the time when the reflected light is incident on the light receiving element. By associating information as to the calculated distance with each pixel of a two-dimensional image acquired by the camera while scanning the detecting light two-dimensionally, it is possible to acquire information as to the shape of the object.

Figure 2:
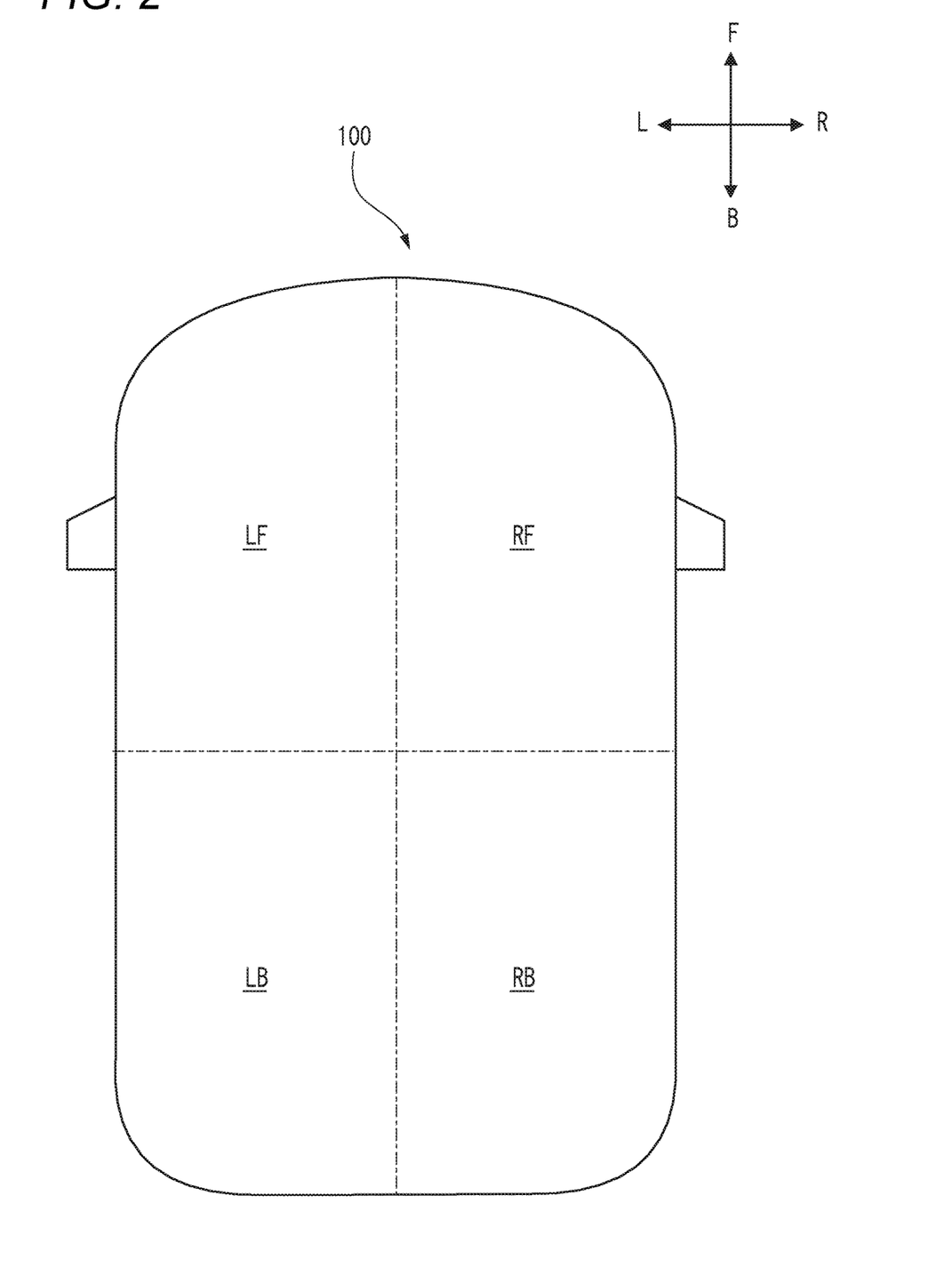
FIG. 2 illustrates a position of the left front sensor device of FIG. 1 in a vehicle.

A right front sensor device having a configuration symmetrical with the left front sensor device 10 illustrated in FIG. 1 relative to the left-right direction may be mounted on a right front portion RF of the vehicle 100 illustrated in FIG. 2. The right front portion RF is an area located on the right of the center in the left-right direction of the vehicle 100 and ahead of the center in the front-rear direction of the vehicle 100.

The configuration of the left front sensor device 10 is also applicable to a left rear sensor device. The left rear sensor device is mounted on a left rear portion LB of the vehicle 100 illustrated in FIG. 2. The left rear portion LB is an area located on the left of the center in the left-right direction of the vehicle 100 and behind the center in the front-rear direction of the vehicle 100. The basic configuration of the left rear sensor device may be symmetric with the left-front sensor device 10 relative to the front-rear direction.

The configuration of the left front sensor device 10 is also applicable to a right rear sensor device. The right rear sensor device is mounted on a right rear portion RB of the vehicle 100 illustrated in FIG. 2. The right rear portion RB is an area located on the right of the center in the left-right direction of the vehicle 100 and behind the center in the front-rear direction of the vehicle 100. The basic configuration of the right rear sensor device may be symmetrical with the above-mentioned left rear sensor device relative to the left-right direction.

The present application is based on Japanese Patent Application No. 2018-148279 filed on Aug. 7, 2018, the entire contents of which are incorporated herein by reference.

The invention claimed is:

1. A sensor system adapted to be installed in a vehicle, comprising:
   a light emitting element configured to emit detecting light toward an outside area of the vehicle;
   a light receiving element configured to output a signal corresponding to reflected light;

a processor configured to detect information of the outside area on the basis of the signal; and a translucent cover configured to form a part of an outer surface of the vehicle, and having a plurality of flat portions configured to allow passage of the detecting light, wherein the processor is configured to exclude, from the information to be detected, information based on the reflected light generated from the detecting light that passed through a position corresponding to a boundary portion between adjacent flat portions of the plurality of flat portions.

2. The sensor system according to claim 1,
wherein a surface of the translucent cover at the boundary portion is made opaque for at least a wavelength of the detecting light.

3. The sensor system according to claim 1,
wherein a surface of the translucent cover at the boundary portion is curved.

4. The sensor system according to claim 1,
wherein the light emitting element and the light receiving element are parts of either a LiDAR sensor unit or a TOF camera unit.

\* \* \* \* \*